US 8,745,613 B2

(12) United States Patent
Bambach et al.

(10) Patent No.: US 8,745,613 B2
(45) Date of Patent: Jun. 3, 2014

(54) METHOD AND CONFIGURATION/SOFTWARE UPDATE SERVER FOR TRANSMITTING DATA BETWEEN A CUSTOMER DEVICE AND THE SERVER

(75) Inventors: Marco Bambach, Ringkobing (DK);
Anton Kruk, Hamminkeln (DE);
Jürgen Stahl, Bocholt (DE)

(73) Assignee: Gigaset Communications GmbH, Munich (DE)

( * ) Notice: Subject to any disclaimer, the term of this patent is extended or adjusted under 35 U.S.C. 154(b) by 1725 days.

(21) Appl. No.: 11/920,855

(22) PCT Filed: Mar. 8, 2007

(86) PCT No.: PCT/EP2007/052185
§ 371 (c)(1),
(2), (4) Date: Nov. 21, 2007

(87) PCT Pub. No.: WO2007/101877
PCT Pub. Date: Sep. 13, 2007

(65) Prior Publication Data
US 2009/0138867 A1    May 28, 2009

(30) Foreign Application Priority Data
Mar. 8, 2006   (EP) ..................................... 06004745

(51) Int. Cl.
*G06F 9/44* (2006.01)
*G06F 15/16* (2006.01)
*G06F 3/048* (2013.01)

(52) U.S. Cl.
USPC ........... 717/171; 709/203; 709/218; 709/219; 715/763; 715/765; 715/773

(58) Field of Classification Search
None
See application file for complete search history.

(56) References Cited

U.S. PATENT DOCUMENTS

| | | | | |
|---|---|---|---|---|
| 5,619,716 A | * | 4/1997 | Nonaka et al. ................. | 717/167 |
| 5,734,705 A | * | 3/1998 | Schlossman et al. ......... | 379/117 |
| 5,751,967 A | * | 5/1998 | Raab et al. ..................... | 709/228 |
| 5,784,555 A | * | 7/1998 | Stone ............................. | 709/220 |
| 5,887,165 A | * | 3/1999 | Martel et al. .................. | 713/100 |
| 5,909,430 A | * | 6/1999 | Reaves .......................... | 370/254 |
| 5,915,008 A | * | 6/1999 | Dulman .................. | 379/221.08 |
| 5,926,463 A | * | 7/1999 | Ahearn et al. ................. | 370/254 |
| 5,963,207 A | * | 10/1999 | Brewer et al. ................. | 715/810 |
| 6,009,153 A | * | 12/1999 | Houghton et al. ....... | 379/102.02 |
| 6,012,088 A | * | 1/2000 | Li et al. ......................... | 709/219 |
| 6,012,100 A | * | 1/2000 | Frailong et al. ............... | 709/250 |
| 6,023,724 A | * | 2/2000 | Bhatia et al. .................. | 709/218 |
| 6,049,826 A | * | 4/2000 | Beser ............................. | 709/222 |
| 6,054,987 A | * | 4/2000 | Richardson ................... | 715/734 |
| 6,219,694 B1 | * | 4/2001 | Lazaridis et al. ............. | 709/206 |
| 6,223,222 B1 | * | 4/2001 | Fijolek et al. ................. | 709/227 |

(Continued)

*Primary Examiner* — Tuan Q. Dam
*Assistant Examiner* — Zheng Wei
(74) *Attorney, Agent, or Firm* — Staas & Halsey LLP (57) ABSTRACT

A method configures, in a semi-automatic manner, a communication device, connected to a packet-switched network, especially Internet, for communication with another, especially remote, subscriber. For this purpose, configuration data are provided on a configuration/software update server and are retrieved by the user of the device according to the user-specific or device-specific conditions by selecting from at least two types of inquiry data characterizing the conditions, e.g. inquiry data containing first country information items and second inquiry data containing second Internet service provider information items, and determination data.

28 Claims, 3 Drawing Sheets

(56) References Cited

U.S. PATENT DOCUMENTS

| | | | |
|---|---|---|---|
| 6,243,815 B1 * | 6/2001 | Antur et al. | 726/11 |
| 6,289,377 B1 * | 9/2001 | Lalwaney et al. | 709/222 |
| 6,308,205 B1 * | 10/2001 | Carcerano et al. | 709/221 |
| 6,314,088 B1 * | 11/2001 | Yamano | 370/254 |
| 6,343,360 B1 * | 1/2002 | Feinleib | 713/1 |
| 6,453,413 B1 * | 9/2002 | Chen et al. | 713/2 |
| 6,615,038 B1 * | 9/2003 | Moles et al. | 455/418 |
| 6,757,723 B1 * | 6/2004 | O'Toole et al. | 709/222 |
| 6,760,755 B1 * | 7/2004 | Brackett | 709/214 |
| 6,772,216 B1 * | 8/2004 | Ankireddipally et al. | 709/230 |
| 6,877,093 B1 * | 4/2005 | Desai et al. | 713/156 |
| 6,901,299 B1 * | 5/2005 | Whitehead et al. | 700/22 |
| 7,225,249 B1 * | 5/2007 | Barry et al. | 709/227 |
| 7,228,538 B1 * | 6/2007 | Burton et al. | 717/170 |
| 7,331,019 B2 * | 2/2008 | Ananth et al. | 715/771 |
| 7,376,571 B1 * | 5/2008 | Racine et al. | 705/1.1 |
| 7,624,393 B2 * | 11/2009 | Egan et al. | 717/173 |
| 7,627,860 B2 * | 12/2009 | Kodosky et al. | 717/141 |
| 7,861,009 B2 * | 12/2010 | Skinner | 710/10 |
| 8,132,127 B2 * | 3/2012 | Baier et al. | 715/866 |
| 8,418,071 B2 * | 4/2013 | Kodosky et al. | 715/763 |
| 2002/0052915 A1 | 5/2002 | Amin-Salehi | |
| 2002/0078185 A1 * | 6/2002 | Swerup et al. | 709/220 |
| 2002/0099934 A1 * | 7/2002 | Cromer et al. | 713/2 |
| 2003/0009537 A1 * | 1/2003 | Wang | 709/219 |
| 2003/0035005 A1 * | 2/2003 | Kodosky et al. | 345/763 |
| 2003/0103088 A1 * | 6/2003 | Dresti et al. | 345/835 |
| 2003/0200321 A1 | 10/2003 | Chen et al. | |
| 2004/0010786 A1 * | 1/2004 | Cool et al. | 717/170 |
| 2004/0044999 A1 * | 3/2004 | Gibson | 717/178 |
| 2004/0139200 A1 * | 7/2004 | Rossi et al. | 709/228 |
| 2004/0209634 A1 * | 10/2004 | Hrastar | 455/515 |
| 2004/0230965 A1 * | 11/2004 | Okkonen | 717/168 |
| 2006/0041641 A1 * | 2/2006 | Breiter et al. | 709/219 |
| 2006/0099971 A1 * | 5/2006 | Staton et al. | 455/456.6 |
| 2006/0150120 A1 * | 7/2006 | Dresti et al. | 715/810 |
| 2007/0037522 A1 * | 2/2007 | Liu et al. | 455/68 |
| 2007/0180386 A1 * | 8/2007 | Ballard et al. | 715/744 |
| 2007/0288558 A1 * | 12/2007 | Land et al. | 709/203 |
| 2008/0126476 A1 * | 5/2008 | Nicholas et al. | 709/203 |
| 2009/0282349 A1 * | 11/2009 | Olsen et al. | 715/760 |

* cited by examiner

FIG 1

METHOD AND CONFIGURATION/SOFTWARE UPDATE SERVER FOR TRANSMITTING DATA BETWEEN A CUSTOMER DEVICE AND THE SERVER

CROSS-REFERENCE TO RELATED APPLICATIONS

This application is based on and hereby claims priority to PCT Application No. PCT/EP2007/052185 filed Mar. 8, 2007 and European Application No. EP06004745 filed on Mar. 8, 2006, the contents of which are hereby incorporated by reference.

BACKGROUND

Communication devices that are connected to a packet-switched network, for example the internet, and registered with an internet service provider (ISP) for internet communication, and which
(i) are designed for different services, for example Voice-over-Internet Protocol (VoIP), Session Initiation Protocol (SIP), messaging, e-mailing, and/or e-mail notification, and
(ii) can be embodied as, for example, a DECT mobile handset of a DECT (Digital Enhanced Cordless Telecommunications) telephone having a base station connected both to a packet-switched and to a circuit-switched network, as a WLAN mobile handset of a WLAN (Wireless Local Area Network) telephone having a WLAN Access Point connected both to a packet-switched and to a circuit-switched network, or as a set-top box (STB) and/or a router require, in contrast to classical communication devices—for instance PSTN (Public Switched Telephone Network) telephones—connected to the circuit-switched network a multiplicity of provider-specific settings that prior to use have to be entered manually via, for example, a web server, or must have been preconfigured in the device. That hugely restricts the marketing of retail devices that are independent of the internet service provider because a simple commissioning of such a device is not possible. Moreover, provider-specific configuration that can be efficiently altered is only laboriously possible with existing methods.

Whereas provider-specific variants of communication devices are preconfigured or remotely configured via a remote management system (for example a system conforming to the "TR 069" specification), retail devices have to be configured manually. The configuration generally has to be performed again if parameters are changed or a different service provider is chosen. A provider-specific configuration variant furthermore frequently has to be set statically or by replacing the device software.

SUMMARY

One possible object is to disclose a method and a configuration/software-update server for transmitting data for the purpose of performing configuring/software updating in a communication device connected to a packet-switched network, especially the internet, as well to disclose the communication device, wherein the communication device can be configured quasi automatically with the data necessary for configuring/software updating when the device is used for communicating with another, in particular remote, user and, where required, updated also in terms of the device software.

The idea underlying the proposed method and devices is for configuration parameters—for example VoIP parameters—required for configuring a communication device connected to the internet to be provided on a configuration/software-update server and for said data to be retrieved by the device user in keeping with the user-specific or device-specific conditions by selecting determination data from at least two types of inquiry data characterizing said conditions—for example inquiry data containing first country-related information and second inquiry data containing information about internet service providers (ISP).

It is therein irrelevant whether the communication device—as mentioned in the introduction—is a retail device or a provider-specific variant of the communication device.

The user of the communication device will thereby be relieved of the error-prone task of entering the configuration parameters manually.

Rather it is the case that the communication device connected to the internet will instead load the configuration parameters into the device quasi automatically according to the user's requirements and possibly controlled by the entry of a user name and password, so that immediate use of the internet will thereafter be possible via the user's chosen internet service provider. The proposed approach is not therein limited to VoIP parameters but will be available for further services, for example SIP parameters, messaging parameters, e-mail account parameters, and/or e-mail notification parameters.

The method will relieve the user of the burden not only of performing a manual configuration but also of purchasing a preconfigured and so limited device. It is suitable especially for small device platforms and does not require a personal computer having a user program, referred to as a "client", for searching through internet documents (WWW browser). What is also characteristic is that parts of the user—or operating—interface are controlled dynamically by the configuration/software-update server. The parameter data stored in server profiles is for that purpose augmented by control information by which operational flows in the device are controlled quasi automatically.

Thus the communication device is put by, for example, the control information into an entering condition. Not only is quasi automatic configuration-parameter downloading possible in said condition; quasi automatic software, parameter, or profile downloading can also be triggered or initiated. The device will in that way always be kept up-to-date in software terms without the user's having to perform any changes on the device. That applies also to installing new parameter sets and profiles, which are available to the user of the communication device dynamically.

What can be considered as communication devices are preferably a DECT mobile handset of a DECT telephone, a WLAN mobile handset of a WLAN telephone, a set-top box, and a router.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
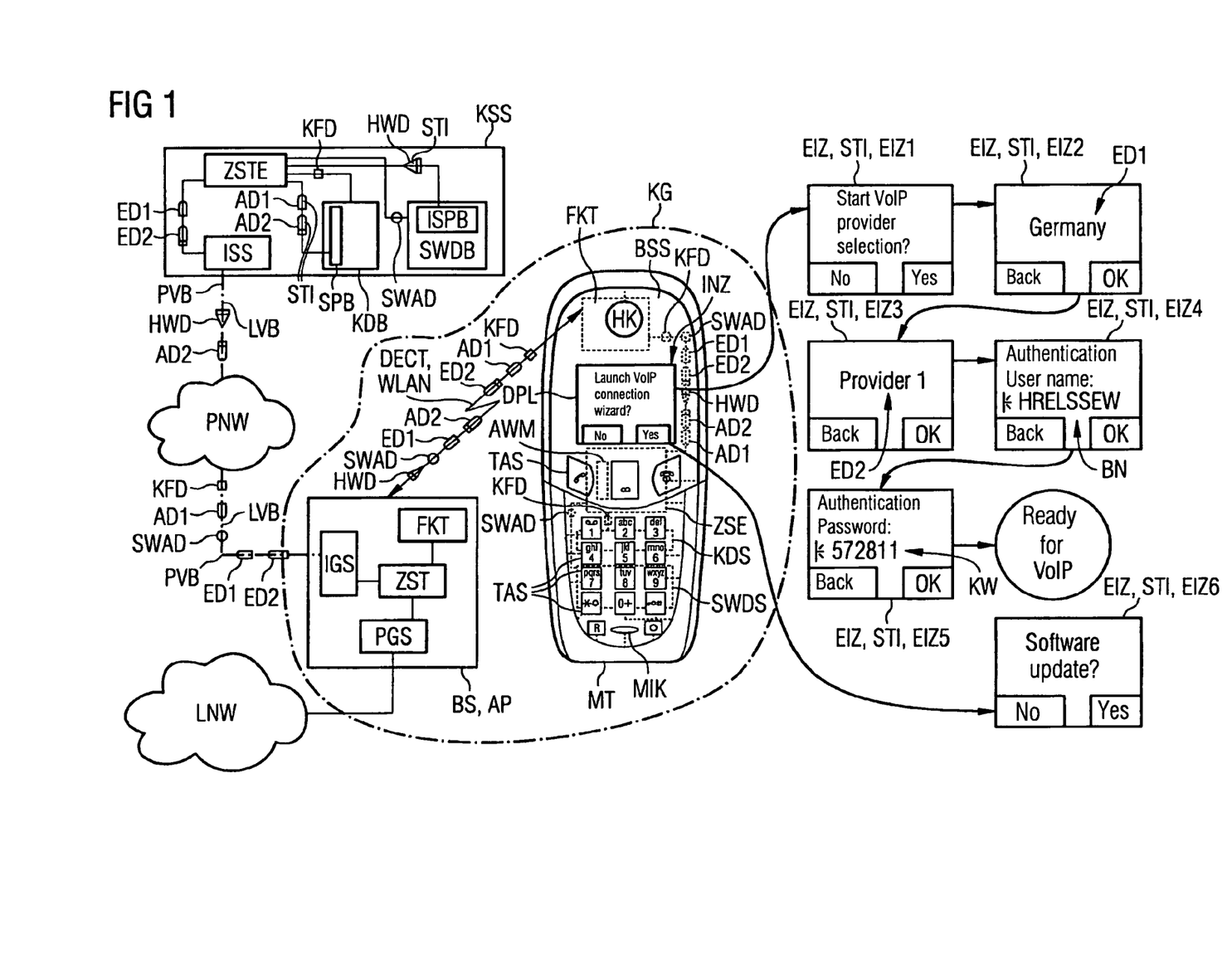
FIG. 1: Acquiring from a configuration/software-update server of configuration parameters/software required for configuring/software updating a communication device connected to the internet

FIG. 1 shows how a communication device KG that is connected to a packet-switched network PNW, for example the internet, is configured for internet communication and updated in terms of the software required therefor by loading configuration parameters or software stored in a configuration/software-update server KSS into the communication device KG. The communication device KG includes, in the present case, a DECT (Digital Enhanced Cordless Telecommunication) telephone having a DECT mobile handset MT and a DECT base station BS connected to the packet-switched network PNW and to a circuit-switched network LNW—the Public Switched Telephone Network (PSTN)—that are connected to each other over a DECT air interface for communicating wirelessly.

As an alternative to that embodiment of the communication device KG it is possible also for the communication device KG to comprise a WLAN (Wireless Local Area Network) telephone having a WLAN mobile handset MT and a WLAN Access Point AP, again connected to the packet-switched network PNW and the circuit-switched network LNW, that are connected to each other over a WLAN air interface for communicating wirelessly. It is furthermore also conceivable for the communication device KG to be a set-top box and/or a router.

Within the scope of internet communication it is possible with the communication device KG to use a multiplicity of services offered by, for example, an internet service provider (ISP) or by another provider to whom the configuration/software-update server KSS belongs or who uses it. Alongside the Voice-over-Internet Protocol (VoIP) service, said services include the Session Initiation Protocol (SIP), messaging, e-mailing, and/or e-mail notification services. To use any of said offered services the communication device KG requires in each case appropriate parameters that are stored in the configuration/software-update server KSS.

So that a user of the communication device KG can load data required for using the offered internet service substantially automatically from the configuration/software-update server KSS into the communication device KG, the user has to perform a few measures on the communication device KG. Said measures include, for instance, configuring and/or software updating. Before these measures are dealt with in detail, the structure necessary therefor of the communication device, including the DECT base station BS and DECT mobile handset MT, and of the configuration/software-update server KSS will be described.

For implementing the air interface conforming to the DECT standard, the base station BS connected to the packet-switched network PNW and to the circuit-switched network LNW has a radio unit FKT and a central control ZST that are connected to each other. Further provided for the connection to the packet-switched network PNW is an internet/device interface IGS that is likewise connected to the central control ZST. A PST/device interface PGS likewise connected to the central control ZST is furthermore contained in the base station BS for the connection to the circuit-switched network LNW.

So that the mobile handset MT can in accordance with the DECT standard communicate wirelessly with the base station BS, the mobile handset MT likewise has a radio unit FKT and a central control device ZSE that are also connected to each other. For performing the aforementioned measures for loading configuration data KFD and software-update data SWAD for using an internet service, the mobile handset MT furthermore has a configuration-data memory KDS, a software-update data memory SWDS, selecting unit AWM, and a user interface BSS. Whereas the selecting unit AWM is integrated preferably directly in the central control device ZSE, the configuration-data memory KDS, the software-update data memory SWDS, and the user interface BSS are connected to the central control device ZSE. For feeding voice in and out, the user interface BSS includes a microphone MIK and an earpiece and, for feeding information in and out, a key panel having a multiplicity of TAS keys as well as a display DPL.

The configuration/software-update server KSS is assigned via an internet/server interface ISS to the packet-switched network PNW. Provided in the configuration/software-update server KSS for the transmission of data are, apart from the internet/server interface ISS, a configuration database KDB, a software-update database SWDB, and a central control unit ZSTE, with the latter being connected both to the internet/server interface ISS and to the configuration database KDB and software-update database SWDB. For controlling said transmission of data, the configuration/software-update server KSS further has, in the configuration database KDB, a memory area SPB and, in the software-update database SWDB, an information storage area ISPB, both of which are likewise connected to the central control unit ZSTE.

Transmitting of the data for the purpose of performing a configuration in the communication device KG begins by putting the mobile handset MT into an initializing condition INZ through connecting the base station BS to the packet-switched network PNW to establish a physical connection PVB between the communication device KG and the configuration/software-update server KSS. An advisory text "Launch VoIP connection wizard?" is in said initializing condition INZ fed out on the display DPL of the mobile handset MT along with a "Yes" softkey and a "No" softkey. If the "Yes" softkey is thereupon actuated by the user of the mobile handset MT, then configuring will start. The mobile handset MT will on said start of configuring establish a logical connection LVB to the configuration/software-update server KSS via the base station BS and authenticate itself to the server by, for instance, while establishing the logical connection transmitting a handset-specific device identifier—for example an IPUI, a MAC address, or an item of data generated randomly by default—that is known to the server. As a result of said logical connection setup, which is detected by the central control unit ZSTE of the configuration/software-update server KSS, said unit will read first inquiry data AD1 and second inquiry data AD2 from the memory area SPB of the configuration database KDB and transmit it for determining the configuration data KFD requiring to be transmitted for the communication device KG via the internet/server interface ISS, the physical connection PVB, and the internet/device interface IGS to the central control ZST of the base station BS. The inquiry data AD1, AD2 is from there transmitted over the DECT air interface to the central control device ZSE in the mobile handset MT.

The inquiry data AD1, AD2 is fed out in the mobile handset MT preferably optically via the display DPL of the user interface BSS. It can, though, also be fed out acoustically, for example via the earpiece HK of the user interface BSS.

The first inquiry data AD1 contains country-related information—relating, for example, to the countries in which the mobile handset MT or communication device KG will from a manufacturer's viewpoint be put into circulation,—whereas the second inquiry data AD2 contains information about internet service providers (ISP)—meaning, for example, the providers that for the purchaser of the device are potential internet service providers (ISP) in a country.

With transmitting of the inquiry data AD1, AD2, control information STI by which the mobile handset MT can be put into follow-up conditions of the initializing condition INZ is transmitted by the configuration/software-update server KSS. Provided for that purpose in the central control device ZSE is the selecting unit AWM that evaluate the control information STI transmitted with the inquiry data AD1, AD2. Entering conditions EIZ are as a result of said evaluation generated by the central control device ZSE via the user interface BSS and displayed on the display DPL.

A further advisory text "Start VoIP provider selection?" appears in a first entering condition EIZ1 on the display DPL of the mobile handset MT, again along with the "Yes" softkey and "No" softkey. If the "Yes" softkey is thereupon actuated by the user of the mobile handset MT, then the user will be requested by a corresponding output on the display DPL of the mobile handset MT to, in a second entering condition EIZ2, select with the aid of a "Back" softkey and an "OK" softkey a country from the country-related information conveyed with the first inquiry data AD1. According to what is shown in FIG. 1, in the second entering condition EIZ2 the user of the mobile handset MT generates a first item of determination data ED1 through the country selection "Germany" by actuating the "OK" softkey.

Upon actuating the "OK" softkey, the user will furthermore again by a corresponding output on the display DPL of the mobile handset MT be requested to, in a third entering condition EIZ3, select with the aid of the "Back" softkey and "OK" softkey an internet service provider from the ISP information conveyed with the second inquiry data AD2. According to what is shown in FIG. 1, in the third entering condition EIZ3 the user of the mobile handset MT generates a second item of determination data ED1 through the provider selection "Provider 1" by actuating the "OK" softkey.

Both sets of determination data ED1, ED2 generated via the user interface BSS (display DPL with softkeys) will then be transmitted by the central control device ZSE over the DECT air interface to the central control ZST in the base station BS. The determination data ED1, ED2 will then be forwarded from there via the internet/device interface IGS, the physical connection PVB, and the internet/server interface ISS to the central control unit ZSTE in the configuration/software-update server KSS.

Instead of being entered optically by the display DPL and the softkeys of the user interface BSS, the determination data ED1, ED2 can also be entered by voice, for example via the microphone MIK of the user interface BSS.

The inquiry data AD1, AD2 as well as the determination data ED1, ED2 can furthermore also be transmitted individually—meaning in each case separately from each other—or, as described above, jointly.

Having received the determination data ED1, ED2, the central control unit ZSTE reads the configuration data KFD corresponding to the determination data ED1, ED2 from the configuration database KDB and transmits it via the internet/server interface ISS, the physical connection PVB, and the internet/device interface IGS to the central control ZST in the base station BS. The configuration data KFD is then forwarded from the central control ZST over the DECT air interface to the central control device ZSE in the mobile handset MT, which device stores the configuration data KFD in the configuration-data memory KDS.

The user of the mobile handset MT is with the stored configuration data KFD and previously mentioned authenticating to the server in principle able to communicate with the configuration/software-update server KSS and could communicate within a "community" registered with the configuration/software-update server KSS. The user would for that purpose have to either terminate or interrupt the launched VoIP connection wizard. Representing of said procedures has, though, been dispensed with in the scope of the exemplary embodiment described with the aid of FIG. 1.

If, on the other hand, the user wants also to be able to use the services of the internet service provider chosen by him/her, then the configuration data KFD received and stored by the configuration/software-update server KSS must also be conveyed to said provider along with a user name BN and a password KW. The user will as a rule already have obtained the user name BN and password KW from said internet service provider by way of, for instance, a postal dispatch marked confidential or an encrypted e-mail received on a personal computer of the user.

To allow for said situation, the user of the mobile handset MT will after actuating the "OK" softkey be in the third entering condition EIZ3 requested again by a corresponding output on the display DPL of the mobile handset MT to, in a fourth entering condition EIZ4, enter a user name "HRELSSEW" BN, already obtained in advance from the internet service provider, with the aid of the TAS keys on the key panel of the user interface BSS and to control the entry with the aid of the "Back" softkey and "OK" softkey. The entry is controlled according to the representation in FIG. 1 by actuating the "OK" softkey.

Through actuating the "OK" softkey in the third entering condition EIZ3, the user will again by a corresponding output on the display DPL of the mobile handset MT be requested to, in a fifth entering condition EIZ5, enter a password "572811" KW, already obtained in advance from the internet service provider, with the aid of the TAS keys on the key panel of the user interface BSS and to control the entry with the aid of the "Back" softkey and "OK" softkey. The entry is controlled according to the representation in FIG. 1 once again by actuating the "OK" softkey, after which—even through not shown explicitly in FIG. 1—the entered user name "HRELSSEW" BN, the entered password "572811" KW, and the configuration data KFD from the configuration-data memory KDS will be conveyed to the internet service provider by the central control device ZSE in the mobile handset MT over the DECT air interface, the central control ZST, and the internet/device interface IGS of the base station BS, and via the physical connection PVB to the internet service provider. The user name "HRELSSEW" BN and password "572811" KW that have been conveyed will be checked in the internet service provider's server and the configuration data KFD stored following a successful check, after which configuration of the communication device KG for the "VoIP" service on the internet service provider's side will have been completed or will be ready for said service.

The communication device KG having the previously described variant embodiments will in the course of internet communication and the use associated therewith of a multiplicity of offered services occasionally need to undergo software updating.

Transmitting of the data for the purpose of performing software updating in the communication device KG begins by putting the mobile handset MT into an initializing condition INZ through connecting the base station BS to the packet-switched network PNW to establish the physical connection PVB between the communication device KG and the configuration/software-update server KSS. An advisory text "Launch VoIP connection wizard?" is in said initializing condition INZ fed out on the display DPL of the mobile handset MT along with a "Yes" softkey and a "No" softkey. If the "Yes" softkey is thereupon actuated by the user of the mobile handset MT, then software updating can take place before configuring starts. As when configuring starts, the mobile handset MT establishes a logical connection LVB to the configuration/software-update server KSS via the base station BS also when software updating starts and authenticates itself to the server by, for instance, while establishing the logical connection transmitting a handset-specific device identifier—for example an IPUI, a MAC address, or an item of data generated randomly by default—that is known to the server. As a result of said logical connection setup, which is detected by the central control unit ZSTE of the configuration/software-update servers KSS, said unit will read advisory data HWD from the information storage area ISPB of the software-update database SWDB and transmit it for informing the user of the communication device about a possible software update via the internet/server interface ISS, the physical connection PVB, and the internet/device interface IGS to the central control ZST of the base station BS. The advisory data HWD is from there transmitted over the DECT air interface to the central control device ZSE in the mobile handset MT.

The advisory data HWD is fed out in the mobile handset MT—like the inquiry data AD1, AD2—preferably optically via the display DPL of the user interface BSS. It can, though, also be fed out acoustically, for example via the earpiece HK of the user interface BSS.

With transmitting of the advisory data HWD, control information STI by which the mobile handset MT can be put into follow-up conditions of the initializing condition INZ is once again transmitted by the configuration/software-update server KSS. Provided for that purpose in the central control device ZSE is the selecting unit AWM that evaluates the control information STI transmitted with the advisory data HWD. Entering conditions EIZ are as a result of said evaluation generated by the central control device ZSE via the user interface BSS and displayed on the display DPL.

A further advisory text "Update software?" appears in a sixth entering condition EIZ6 on the display DPL of the mobile handset MT, again along with the "Yes" softkey and "No" softkey. If the "Yes" softkey is thereupon actuated by the user of the mobile handset MT, then the user's wish to perform software updating will be notified by the central control device ZSE over the DECT air interface, the central control ZST, and the internet/device interface IGS in the base station BS, the physical connection PVB, and the internet/server interface ISS to the central control unit ZSTE in the configuration/software-update server KSS.

The central control unit ZSTE then reads software-update data SWAD from the software-update database SWDB and transmits it via the internet/server interface ISS, the physical connection PVB, and the internet/device interface IGS to the central control ZST in the base station BS. The configuration data KFD is finally forwarded from the central control ZST over the DECT air interface to the central control device ZSE in the mobile handset MT, which device stores the software-update data SWAD in the software-update data memory SWDS.

Figures 2, 2A:
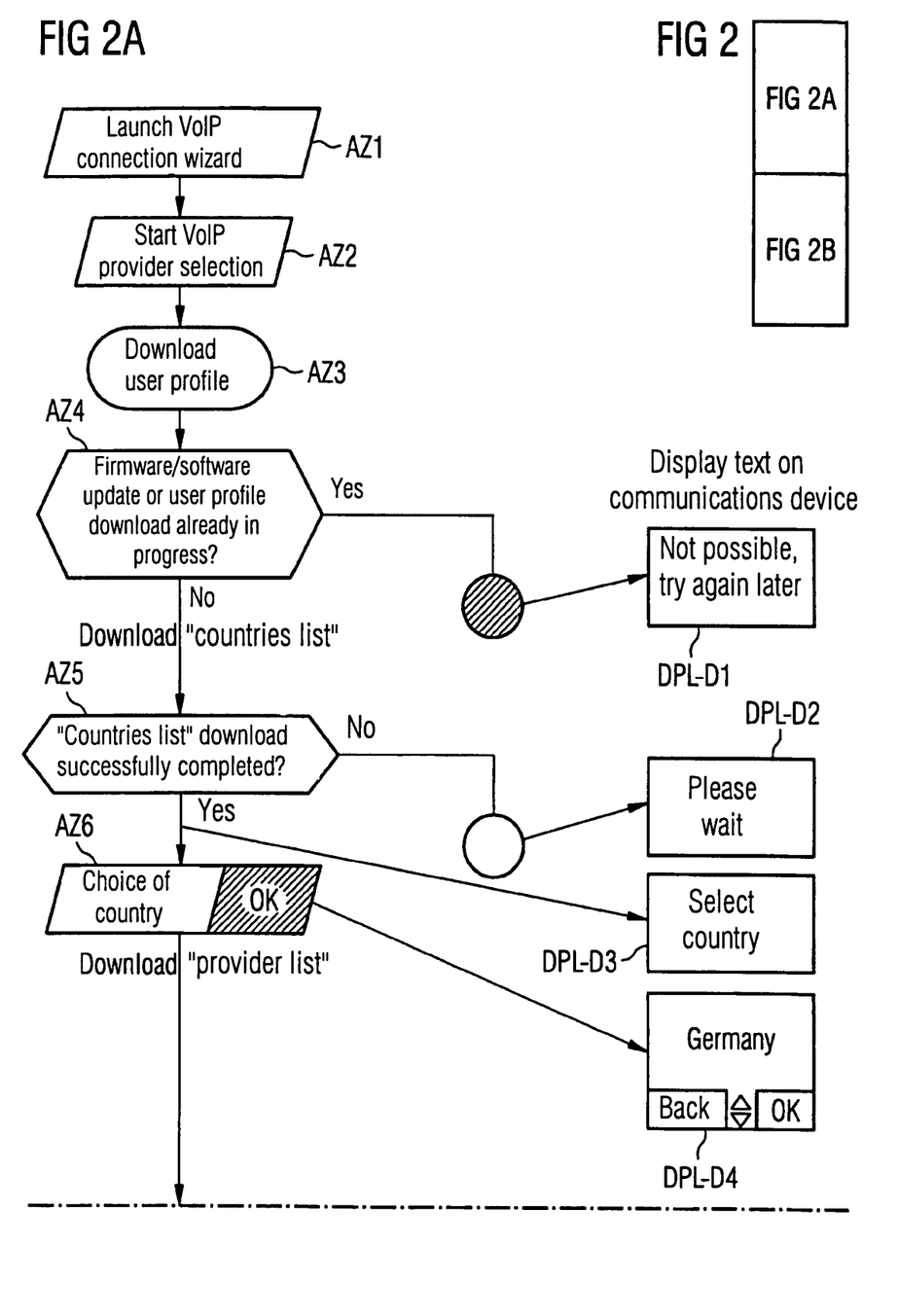
FIG. 2: Flowchart of the acquiring of configuration parameters
Figure 2B:
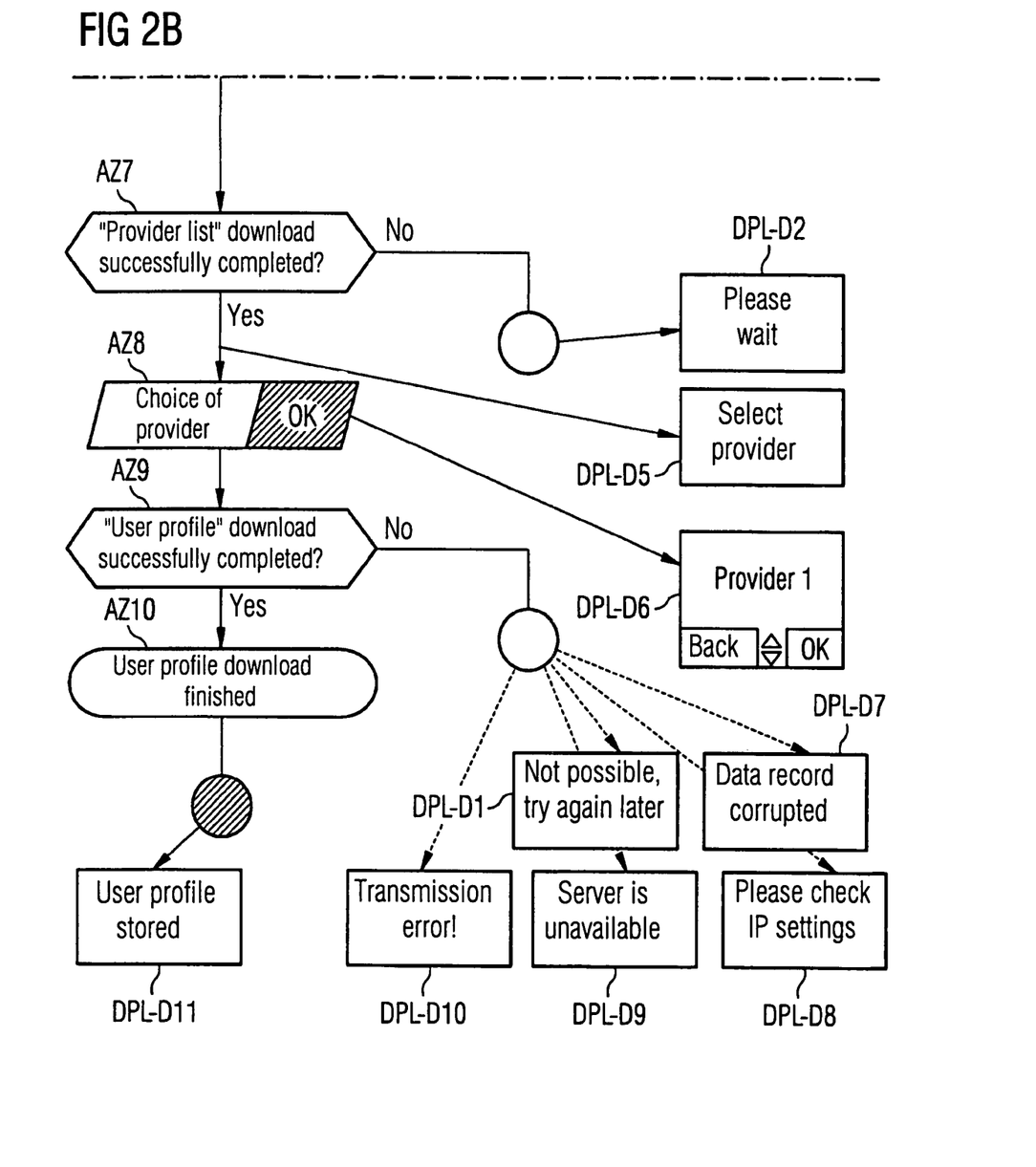

FIG. 2 is a flowchart of the acquiring of configuration data KFD by the communication device KG from the configuration/software-update server KSS based on what has been explained in connection with FIG. 1.

The VoIP connection wizard is launched in a first flow condition AZ1 in the communication device KG. VoIP provider selection is then launched in the communication device KG in a second flow condition AZ2. The communication device KG starts in an ensuing third flow condition AZ3 to download a user profile from the configuration/software-update server KSS, with its being inquired in a fourth flow condition AZ4 whether firmware/software updating or user-profile downloading is already in progress. If the response to said inquiry is "Yes", then a first display text "Not possible, try again later" DPL-D1 will be fed out on the display DPL of the communication device KG. Otherwise, if the response is "No", the communication device KG will start downloading a countries list from the configuration/software-update server KSS. A check is performed in a fifth flow condition AZ5 to determine whether downloading of the countries list has been successfully completed. If the check shows that not to be the case (the response to the inquiry is "No"), then a second display text "Please wait" DPL-D2 will be fed out on the display DPL of the communication device KG. Otherwise, if the response is "Yes", a third display text "Select country" DPL-D3 will appear on the display of the communication device KG. A country is selected in a sixth flow condition AZ6 through the user's actuating an "OK" key, as the result of which a fourth display text "Germany" along with a "Back" softkey and an "OK" softkey DPL-D4 will appear on the display of the communication device KG and the communication device KG will start downloading a provider list from the configuration/software-update server KSS. It is next clarified, in a fifth flow condition AZ7, whether downloading of the provider list has been successfully completed. If clarifying shows that not to be the case (the response to the inquiry is "No"), then the second display text "Please wait" DPL-D2 will again be fed out on the display DPL of the communication device KG. Otherwise, if the response is "Yes", a fifth display text "Select provider" DPL-D5 will appear on the display of the communication device KG. A provider is then selected in an eighth flow condition AZ8 through the user's again actuating the "OK" key, as the result of which a sixth display text "Provider 1" along with a "Back" softkey and an "OK" softkey DPL-D6 will appear on the display of the communication device KG. It is then inquired in a ninth flow condition AZ9 whether user-profile downloading started in the third flow condition AZ3 has been successfully completed. If the response to said inquiry is "No", then either once again the first display text "Not possible, try again later" DPL-D1, or a seventh display text "Data record is corrupted!" DPL-D7, an eighth display text "Please check IP settings" DPL-D8, a ninth display text "Server is unavailable" DPL-D9, or a tenth display text "Transmission error!" DPL-D10 will be fed out on the display DPL of the communication device KG.

Otherwise, if the response is "Yes", user-profile downloading will have been completed with a tenth flow condition AZ10 and an eleventh display text "User profile stored" DPL-DL11 will appear on the display DPL of the communication device KG.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for transmitting data regarding software for a communication device having a packet-switched internet connection, comprising:
   connecting the communication device via the internet to a configuration/software-update server;
   putting the communication device into an initializing condition by the user of the communication device entering a command;
   establishing a logical connection between the configuration/software-update server and the communication device;
   transmitting first and second inquiry data options and control information by which the communication device can be put into entering conditions of the initializing condition, from the configuration/software-update server to the communication device;
   evaluating, by a central control device of the communication device, the control information transmitted with the inquiry data options and generating the entering conditions, each entering condition being associated with a display on a display panel of the communication device and with user interface conditions that are adapted to the respective inquiry data option;
   selecting by the user of the communication device, a first item of determination data from the first inquiry data options and a second item of determination data from the second inquiry data options;
   transmitting the first and second items of determination data from the communication device to the configuration/software-update server;
   reading from a configuration database, configuration data corresponding to the first and second items of determination data; and
   transmitting the configuration data to the communication device.

2. The method as claimed in claim 1 wherein the user of the communication device is requested by the control information to enter a user name and a password.

3. The method as claimed in claim 1 wherein the first inquiry data options contain country-related information and the second inquiry data options contain information about internet service providers.

4. The method as claimed in claim 1 wherein the first item of determination data is used to indicate in which country the communication device is connected to the internet.

5. The method as claimed in claim 1 wherein the second item of determination data is used to indicate via which internet service provider the communication device is connected to the internet.

6. The method as claimed in claim 1 wherein the user enters the first and second items of determination using keys on the communication device and/or voice recognition.

7. The method as claimed in claim 1 wherein the inquiry data options and the advisory data are acoustically and/or optically supplied to the user.

8. The method as claimed in claim 1 wherein the communication device is a Digital Enhanced Cordless Telecommunications (DECT) telephone,
   the DECT telephone has a DECT mobile handset and a DECT base station,
   the DECT mobile handset is enabled for Voice-over-Internet Protocol communication, Session Initiation Protocol communication, messaging, e-mailing, and/or e-mail notification, and
   the DECT base station is connected both to the packet-switched internet and to a circuit-switched network.

9. The method as claimed in claim 1 wherein
   the communication device is a Wireless Local Area Network (WLAN) mobile handset,
   the WLAN mobile handset is enabled for the Voice-over-Internet Protocol communication, Session Initiation Protocol communication, messaging, e-mailing, and/or e-mail notification, and
   the WLAN mobile handset is part of a WLAN telephone having a WLAN Access Point connected both to the packet-switched internet and to a circuit-switched network.

10. The method as claimed in claim 1 wherein a set-top box and/or a router are/is used as the communication device.

11. The method as claimed in claim 1, wherein the first and second items of determination data are transmitted from the communication device over a Digital Enhanced Cordless Telecommunications (DECT) air interface to a central control device in a base station, and
   the central control device in the base station forwards the first and second items of determination data to the configuration/software-update server.

12. The method as claimed in claim 1, wherein the first and second items of determination data are transmitted from the communication device over a Wireless Local Area Network (WLAN) to a central control device in a WLAN Access Point, and
   the central control device in the WLAN Access Point forwards the first and second items of determination data to the configuration/software-update server.

13. The method as claimed in claim 1, wherein each entering condition comprises a conditioning of a softkey.

14. The method as claimed in claim 13, wherein different softkeys are conditioned for different entering conditions.

15. A communication device for transmitting data regarding software, the communication device having a packet-switched internet connection, comprising:
   an internet/device interface via which the communication device is connected to a configuration/software-update server;
   a user interface;
   a display panel
   a central control device having an assigned configuration-data memory, the central control device being connected to the user interface and to the internet/device interface in such a way that:
     an initializing condition of the communication device is communicated to a user of the communication device through the user interface,
     configuration is initiated by a command being entered via the user interface,
     when configuration starts, a logical connection to the configuration/software-update server is established via the internet/device interface;
     the internet/device interface receives and forwards to the central control device, first and second inquiry data options and control information by which the communication device can be put into entering conditions of the initializing condition,
     the central control device evaluates the control information received with the inquiry data options and generates the entering conditions, each entering condition being associated with a display on the display panel and with user interface conditions that are adapted to the respective inquiry data option, a first item of determination data is selected from the first inquiry data options and a second item of determination data is selected from the second inquiry data options via respective entries using the user interface, the first and second inquiry data options are transmitted by the central control device to the configuration/software-update server via the internet/device interface, configuration data sent by the configuration/software-update server and corresponding to the first and second items of determination data are received by the internet/device interface and forwarded to the central control device, and the first and second items of determination data are stored in the configuration-data memory.

16. The communication device as claimed in claim 15 wherein
the control information causes the user of the communication device to be requested by the central control device and the user interface to enter a user name and a password.

17. The communication device as claimed in claim 15 wherein
country-related information is contained in the first inquiry data options and information about internet service providers is contained in the second inquiry data options.

18. The communication device as claimed in claim 15 wherein
the first item of determination data indicates in which country the communication device is connected to the internet.

19. The communication device as claimed in claim 15 wherein
the second item of determination data indicates via which internet service provider the communication device is connected to the internet.

20. The communication device as claimed in claim 15 wherein
the user interface is embodied in such a way that the first and second items of determination data are entered via keys on the communication device and/or voice recognition.

21. The communication device as claimed in claim 15 wherein
the user interface outputs the inquiry data options and the advisory data acoustically and/or optically.

22. The communication device as claimed in claim 15 wherein
the communication device is embodied as a Digital Enhanced Cordless Telecommunications (DECT) telephone,
the DECT telephone has a DECT mobile handset and a DECT base station,
the DECT mobile handset is enabled for Voice-over-Internet Protocol communication, Session Initiation Protocol communication, messaging, e-mailing, and/or e-mail notification, and
the DECT base station is connected both to the packet-switched internet and to a circuit-switched network.

23. The communication device as claimed in claim 15 wherein
the communication device is embodied as a Wireless Local Area Network (WLAN) mobile handset,
the WLAN mobile handset is enabled for the Voice-over-Internet Protocol communication, Session Initiation Protocol communication, messaging, e-mailing, and/or e-mail notification, and the WLAN mobile handset is part of a WLAN telephone having a WLAN Access Point connected both to the packet-switched internet and to a circuit-switched network.

24. The communication device as claimed in claim 15 wherein
the communication device is embodied as a set-top box and/or a router.

25. A configuration/software-update server for transmitting data to a communication device having a packet-switched internet connection, the data relating to software, the server comprising:
an internet/server interface via which the configuration/software-update server is connected to the communication device;
a central control unit having an assigned configuration database, the central control unit, the configuration database and the internet/server interface being embodied and connected to each other in such a way that:
while a logical connection is established by the communication device between the communication device and a central control unit via the internet/server interface, the central control unit reads from a memory area of the configuration database, first and second inquiry data options and control information by which the communication device can be put into entering conditions of the initializing condition,
the first and second inquiry data options and the control information are transmitted to the communication device via the internet/server interface, so that a central control device of the communication device can evaluate the control information transmitted with the inquiry data options and generate the entering conditions, each entering condition being associated with a display on a display panel of the communication device and with user interface conditions that are adapted to the respective inquiry data option;
the central control unit receives from the communication device via the internet/server interface a first item of determination data and a second item of determination data selected respectively from the first inquiry data options and from the second inquiry data options, and
the central control unit reads configuration data corresponding to the first and second items of determination data from the configuration database and transmits the configuration data via the internet/server interface to the communication device.

26. The configuration/software-update server as claimed in claim 25 wherein
country-related information is contained in the first inquiry data options and information about internet service providers is contained in the second inquiry data options.

27. The configuration/software-update server as claimed in claim 25 wherein
the first item of determination data indicates in which country the communication device is connected to the internet.

28. The configuration/software-update server as claimed in claim 25 wherein
the second item of determination data indicates via which internet service provider the communication device is connected to the internet.

* * * * *